United States Patent
Okamoto et al.

(10) Patent No.: US 6,385,239 B1
(45) Date of Patent: May 7, 2002

(54) ADAPTIVE EQUALIZING CIRCUIT

(75) Inventors: Toshinori Okamoto; Youichi Ogura, both of Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/647,428

(22) PCT Filed: Feb. 1, 2000

(86) PCT No.: PCT/JP00/00544

§ 371 Date: Nov. 15, 2000

§ 102(e) Date: Nov. 15, 2000

(87) PCT Pub. No.: WO00/46802

PCT Pub. Date: Aug. 10, 2000

(30) Foreign Application Priority Data

Feb. 2, 1999 (JP) .......................................... 11-025423

(51) Int. Cl.[7] ................................................ H03H 7/30
(52) U.S. Cl. ...................................... 375/232; 708/323
(58) Field of Search ................................. 375/229, 232; 708/323

(56) References Cited

U.S. PATENT DOCUMENTS

| 5,345,452 A | | 9/1994 | Matui | |
| 5,400,189 A | * | 3/1995 | Sato et al. | 375/232 |
| 5,577,068 A | * | 11/1996 | Bottomley et al. | 375/232 |
| 5,680,380 A | * | 10/1997 | Taguchi et al. | 369/48 |

FOREIGN PATENT DOCUMENTS

| JP | 6-20208 | 1/1994 |
| JP | 8-153370 | 6/1996 |
| JP | 8-249606 | 9/1996 |
| JP | 10-320918 | 12/1998 |

* cited by examiner

Primary Examiner—Temesghen Ghebretinsae
(74) Attorney, Agent, or Firm—Wenderoth, Lind & Ponack, L.L.P.

(57) ABSTRACT

High-order partial response equalization is performed so that the equalization error of an input signal having non-linear distortions is minimized, thereby improving the characteristics of a reproduced signal. An input signal is subjected to high-order partial response equalization adapted to a non-linear distortion waveform by using a transversal filter 3; a provisional equalization target value is estimated by a provisional decision circuit 4; an error between the provisionally decided value and the input signal is detected by an error detection circuit 5; an error between the provisionally decided value and the output signal from an A/D converter 1 is detected by an input distortion detection circuit 7; the error outputted from the error detection circuit 5 is monitored by an output distortion detection circuit 6; the equalization target value is controlled by an equalization target control means 8 so that the equalization error is minimized; and tap coefficients are controlled by a tap coefficient control means 10.

3 Claims, 7 Drawing Sheets

ADAPTIVE EQUALIZING CIRCUIT

TECHNICAL FIELD

The present invention relates to an adaptive equalization circuit implemented by a digital circuit and, more particularly, to an adaptive equalization circuit that is suitable for equalization of a non-linear signal, and performs high-order partial response equalization so that an equalization error of a reproduced signal having non-linear distortions is minimized when reproducing it from a high-density recording medium, thereby improving the characteristics of the reproduced signal.

BACKGROUND ART

In an apparatus for recording and reproducing data in/from recording media, reproduction of data is carried out without being affected by non-linear distortions, by using a method of detecting non-linear distortions from a waveform and correcting the waveform with an equalizer to remove the non-linear distortions, or a method of controlling the slice level of maximum likelihood decoding.

That is, in the recording/playback apparatus, when the reproduced signal has a waveform with non-linear distortions, an adaptive equalization method is employed, in which the distortions of the waveform are estimated from the reproduced signal to decide the characteristics of the equalizer. To be specific, filter coefficients of the equalizer are optimized so that the second power error between the level after the equalization and the original level of the reproduced signal is minimized.

Further, when equalizing the reproduced signal during playback of recorded data from the recording medium, partial response equalization is employed to suppress enhancement of the high frequency band components of the reproduced signal characteristics and to prevent the error rate from being increased due to noise.

The partial response equalization is a method of provisionally deciding multiple values by appropriately controlling the quantity of interference between codes in a signal, and restricting the signal power with respect to the frequency instead of the decision.

That is, a target signal to be equalized and a signal obtained by delaying the target signal are superposed to make the multi-valued levels easy to appear, and the signal is decoded by performing provability calculation using a Viterbi decoder or the like. Thereby, the levels of the signal are easily detected without using the high frequency band components of the signal.

A conventional equalizer performing such partial response equalization has the following characteristics. That is, when the equalizer receives a reproduced signal from a portion corresponding to an edge of a recording pit of an optical magnetic recording medium or a portion where the direction of vertical magnetization is inverted, it equalizes the reproduced signal to an equalization target value. Therefore, equalization to the target value is not compulsory performed on a portion of the waveform amplitude where the codes are continuous, excluding the both edges of the portion, and thus the high frequency components included in the reproduced signal are prevented from being emphasized unnecessarily, whereby the noise included in the input signal of the equalizer is prevented from being transmitted to the output signal of the equalizer.

Further, when the characteristics of the reproduced signal vary, the SN ratio of the output signal from the equalizer can be maintained by adaptively controlling the characteristics of the equalizer.

This equalizer uses only its output corresponding to the code-inverted portion of the reproduced waveform of the optical disk as a signal for controlling tap coefficients of the equalizer, and adaptively controls the tap coefficients so that the output from the equalizer is partial-response-equalized.

An example of a conventional equalizer as described above is shown in FIG. 2.

An adaptive equalizer shown in FIG. 2 is one disclosed in, for example, Japanese Published Patent Application No. Hei. 8- 153370, and this equalizer detects a position corresponding to a pit edge of a reproduced signal or a portion where the direction of magnetization is inverted in vertical magnetic recording, and performs equalization to predetermined reference amplitudes {−1,0,+1} at the detected position. Reference amplitudes corresponding to other positions than mentioned above are not defined.

This equalizer has three values "−1", "0", and "+1" as reference amplitudes. In FIG. 2, 27 denotes an input terminal for receiving a signal to be subjected to waveform equalization, and 12a, 12b, and 12c denote delay means which are connected in series in this order, and each delay means delays its input signal by one unit time T. The signal outputted from the input terminal 27 is applied to the delay means 12a. Further, 25a, 25b, and 25c denote correlators for correlating the output signals from the delay means 12a, 12b, 12c with an output signal from a switch 24 described later, respectively. Further, 26a, 26b, and 26c denote integrators for integrating the output signals from the correlators 25a, 25b, and 25c, respectively.

Further, 20 denote a transversal equalization circuit. In the transversal equalization circuit 20, 12d and 12e denote delay means which are connected in series in this order, and each delay means delays its input signal by one unit time T. The signal outputted from the input terminal 27 is applied to the delay means 12d. Further, 16a, 16b, and 16c denote buffers as multipliers. These buffers 16a, 16b, and 16c receive, as control signals, the output signals from the integrators 26a, 26b, and 26c, and receive, as input signals, the input signal to the delay means 12d, the output signal from the delay means 12d, and the output signal from the delay means 12e, respectively. 14a denotes an adder for adding the output signals from the buffers 16a and 16b, and 14b denotes an adder for adding the output signals from the adder 14a and the buffer 16c.

Furthermore, 28 denotes an output terminal for outputting the output signal from the adder 14b, that is, the signal which has been subjected to waveform equalization by the adaptive equalizer; 21 denotes a ternary decision circuit for subjecting the signal R from the output terminal 28 to ternary decision; 22 denotes a reference amplitude generation circuit for generating a signal D having a reference amplitude on the basis of the output signal from the ternary decision circuit 21; 17 denotes a subtracter for subtracting the signal R at the output terminal 28 from the output signal D of the reference amplitude generation circuit 22; 29 denotes a delay circuit for delaying an error signal E1 outputted from the subtracter 17 by one unit time T; 24 denotes a switch for disconnecting the output of the delay circuit 29 and generating an error signal E2 to be supplied to the correlators 25a, 25b, and 25c; and 23 denotes an error signal selection circuit for outputting a selection signal S for controlling the switch 24, on the basis of the output from the ternary decision circuit 21.

Next, the operation will be described. The signal, which is obtained by subjecting the output signal R from the transversal equalization circuit 20 to ternary decision by the ternary decision circuit 21, is converted to a ternary signal D having a reference amplitude by the reference amplitude generation circuit 22. The output signal R and the ternary signal D are input to the subtracter 17, and an output error signal E1 is taken out.

The error signal selection circuit 23 extracts, from the output signal of the ternary decision circuit 21, the timing at which an effective error signal is output, and outputs a selection signal S. The switch 24 is operated by the selection signal S so as to send only the effective error signal as a reference error signal E2 to the correlator 25. When the selection signal S becomes active, the switch 24 is closed, whereby the input E2 to the correlator becomes equal to E1. As a result, the tap coefficients of the transversal equalization circuit 20 are adaptively controlled according to the correlation between the reference error signal E2 and the input signal from the input terminal 27.

On the other hand, when the selection signal S is inactive, the switch 24 is opened, and the reference error signal E2 to be input to each correlator 25 becomes "0". So, the values of the tap coefficients of the multiplier 16 in the transversal equalization circuit 20 are not changed.

There are two output signals from the ternary decision circuit 21, and it is assumed that these signals are T1 and T2.

These output signals T1 and T2 from the ternary decision circuit 21 may have any of the following three states according to the level of the input R: both T1 and T2 being inactive, only T1 being active, and both T1 and T2 being active. The reference amplitude generation circuit 22 generates a ternary signal D having a reference amplitude according to the state of the output signals T1 and T2 from the ternary decision circuit.

The error signal selection circuit 23 decides whether the error signal E1 is to be used as a reference error signal E2 or not. When the output signal T1 from the ternary decision circuit 21 is inactive for successive three or more times or when the output signal T2 from the ternary decision circuit 21 is inactive for successive three or more times, the selection signal S to the switch 24 becomes inactive to exclude the error signal E1 from the reference error.

In this construction, since there is a delay equivalent to unit time T in the error signal selection circuit 23, a delay means 29 is needed between the subtracter 17 and the switch 24 as shown in FIG. 2. Further, with this delay, the delay in the equalizer input signal to be input to the correlator 25 is increased by time T.

As an example, a description is given of equalization characteristics obtained as the result of adaptively controlling the equalizer characteristics such that the second power of a difference between the equalizer output value and any of the three equalization target values {−1,0,+1} of PR(1,1) is minimized for only the edge of the recording pit, during optical recording in the case where the amplitude of the reproduced signal is lowered due to high recording density. The PR(1,1) means that, when performing partial response equalization, a weight of "1" is given to each of the original signal and the signal obtained by delaying the original signal by one unit time.

In this case, although the equalizer has three equalization target values, two values larger in level than the three target values appear in the equalizer output and, therefore, the equalizer output is distributed concentrating on the five equalization target values in total.

On the other hand, as another example, when the equalizer characteristics are adaptively controlled such that the equalization target values are set at {±1} and a difference between the equalizer output value and one of these two values is minimized, two values appear in the equalizer output in addition to the two target values, resulting in four values of reference amplitudes.

Although the low-order partial response method is used to equalize the reproduced signal to the five or four values of reference amplitudes which are not necessarily equal to the reference amplitude of the partial response characteristics, actually equalization is carried out as if using the high-order partial response method. Therefore, the gain of the high frequency band component of the reproduced signal is reduced as compared with that of the typical PR (1,1) equalizer. Having such frequency characteristics, the reproduced signal power which is concentrated on the low frequency band during high density recording can be efficiently extracted and removed without emphasizing the noise in the high frequency band, whereby the error rate of the equalizer output is improved.

In the following maximum likelihood decoder such as a Viterbi decoder to which the equalizer output is applied, the recorded data is decoded with improved error rate, by the method of controlling the slice level using the equalizer output as the reference amplitudes.

By the way, since equalization using a transversal filter is performed to remove linear distortions, waveform distortions comprising only linear distortions are effectively removed from the reproduced signal by equalization using a transversal filter. However, there may be a case where the waveform distortions cannot be effectively removed, depending on the signal waveform.

For example, a reproduced waveform 60 having asymmetry as shown in FIG. 6 corresponds to this case. In the reproduced waveform 60, the convex portions of the reproduced waveform correspond to recording pits 61, and the concave portions thereof correspond to non-recording pits. When this signal is reproduced with a magnetic head, the amplitude level of the waveform of the reproduced signal reaches the saturation level when the recording pit 61 or the interval between the recording pits 61 is relatively long, while the amplitude level of the waveform of the reproduced signal becomes smaller than the saturation level 62 when the recording pit 61 or the interval between the recording pits 61 is relatively short, resulting in non-linear distortions in the reproduced signal.

Further, when performing high-density recording on an optical disk as shown in FIG. 7, a recording pit 75 is continuously formed by a laser beam 70. At this time, in the recording pit 75, the irradiation time with the laser beam 70 varies from portion to portion, whereby the area in the recording pit 75 is not recorded at a uniform level, resulting in unevenness in the recorded signal level in the pit area.

When the recorded signal is reproduced with the laser beam 70, the reproduced waveform has non-linear distortions in a portion 74 where the recorded signal level is uneven. The non-linear distortion components included in the waveform having the non-linear distortions cannot be removed by equalization using a transversal filter. Therefore, waveform equalization is not carried out satisfactorily, resulting in increased error rate.

In the conventional recording/playback apparatus, for the reason described above, non-linear distortions occur in the reproduced signal when the recording density is high. Further, since noise is included in the reproduced signal, when the level of recorded data is detected from the reproduced signal whose amplitude is degraded, incorrect level is detected, resulting in considerable increase in the error rate.

Since an equalizer is usually composed of constituents such as signal delay units, adders, and multipliers, when it performs equalization on a signal having non-linear distortions, it cannot remove the non-linear components. Therefore, the error between the output of the equalizer and the equalization target value varies under influence of the non-linear characteristics, whereby the equalization efficiency is reduced, and the deviation of the waveform from the equalization target value is increased. As the result, it is difficult to equalize the signal waveform to the equalization target value.

Further, when the equalizer performs partial response equalization on a reproduced signal from a high-density recording medium, since the higher harmonic components of the reproduced signal are emphasized, the noise of the high frequency band characteristics having low amplitude, which is included in the reproduced signal, is amplified, whereby the signal after the equalization is deteriorated. As the result, there is the possibility that the output signal from the equalizer may include an error signal.

Further, the conventional equalizer performs equalization on the reproduced signal having non-linear distortions in high-density recording, by using low-order partial response equalization. However, with respect to the PR (1,1), since fixed values like "−1", "0", and "+1" are used as equalization target values, it is difficult to reset the equalization target values to those suited to waveform equalization. Therefore, it is difficult to perform adaptive equalization of the reproduced waveform with higher precision.

The present invention is made to solve the above-described problems and has for its object to provide an adaptive equalization circuit suited to a non-linear signal, which can perform highly precise adaptive equalization and improve the error rate.

DISCLOSURE OF THE INVENTION

In order to solve the above-described problems, an adaptive equalization circuit according to the invention of claim 1 equalizes an input signal having non-linear distortions, and comprises a linear equalization means for subjecting the input signal having non-linear distortions to high-order partial response equalization adapted to the input signal; a provisional decision circuit for receiving, as an input signal, the output signal from the linear equalization means, and estimating an equalization target value for performing equalization without being affected by the non-linear distortions of the input signal; an error detection circuit for detecting an error between the provisionally decided equalization target value obtained from the provisional decision circuit and the output signal from the linear equalization means; an input distortion detection circuit for detecting an error between the provisionally decided value obtained from the provisional decision circuit and the input signal; an output distortion detection circuit for monitoring the error outputted from the error detection circuit; an equalization target control means for controlling the equalization target value from the provisional decision circuit so that the equalization error is minimized, on the basis of the signals detected by the error detection circuit, the input distortion detection circuit, and the output distortion detection circuit; and a tap coefficient control circuit for controlling tap coefficients of the linear equalization means on the basis of the error detected by the error detection circuit.

Thereby, in the high-order partial response equalization, the non-linear distortions possessed by the signal before the equalization and those possessed by the signal after the equalization are observed quantitatively, and an equalization target value at which the equalization error is minimized is automatically set on the basis of the values, whereby the partial response equalization adapted to the input signal having non-linear distortions is realized. Therefore, even a reproduced signal having non-linear distortions can be equalized with high precision by using a transversal filter that is a linear equalization system, resulting in improved error rate.

Further, according to the invention of claim 2, in an adaptive equalization circuit as described in claim 1, the provisional decision circuit comprises a binary decision circuit for deciding that the output signal from the linear equalization means is either "0" or "1"; an addition circuit for subjecting the signal obtained by the binary decision circuit to calculation based on high-order partial response type addition, to obtain how many equalization target values exist; and an equalization target value selection circuit for selecting an appropriate equalization target value from the prepared equalization target values, on the basis of the signal obtained by the addition circuit.

Thereby, it is detected in advance that there are five equalization target values, and adaptive equalization is controlled according to these values. Further, an appropriate equalization target value can be selected from the updated equalization target values, whereby an equalization target value for equalization can be estimated without being affected by the input signal having non-linear distortions.

Further, according to the invention of claim 3, in an adaptive equalization circuit as described in claim 1, the equalization target control means updates the plural equalization target values at the same time or updates every other equalization target values when controlling the equalization target value so as to minimize the equalization error.

Thereby, the equalization target values can be controlled so as to minimize the equalization error, without being affected by non-linear distortions included in the input signal.

BEST MODE TO EXECUTE THE INVENTION

Embodiment 1

In this first embodiment, an adaptive equalization circuit suited to a non-linear signal, which performs highly precise adaptive equalization and improves the error rate, is implemented by a digital circuit, by using high-order partial response equalization suited to a signal having non-linear distortions at high recording density.

Figure 1:
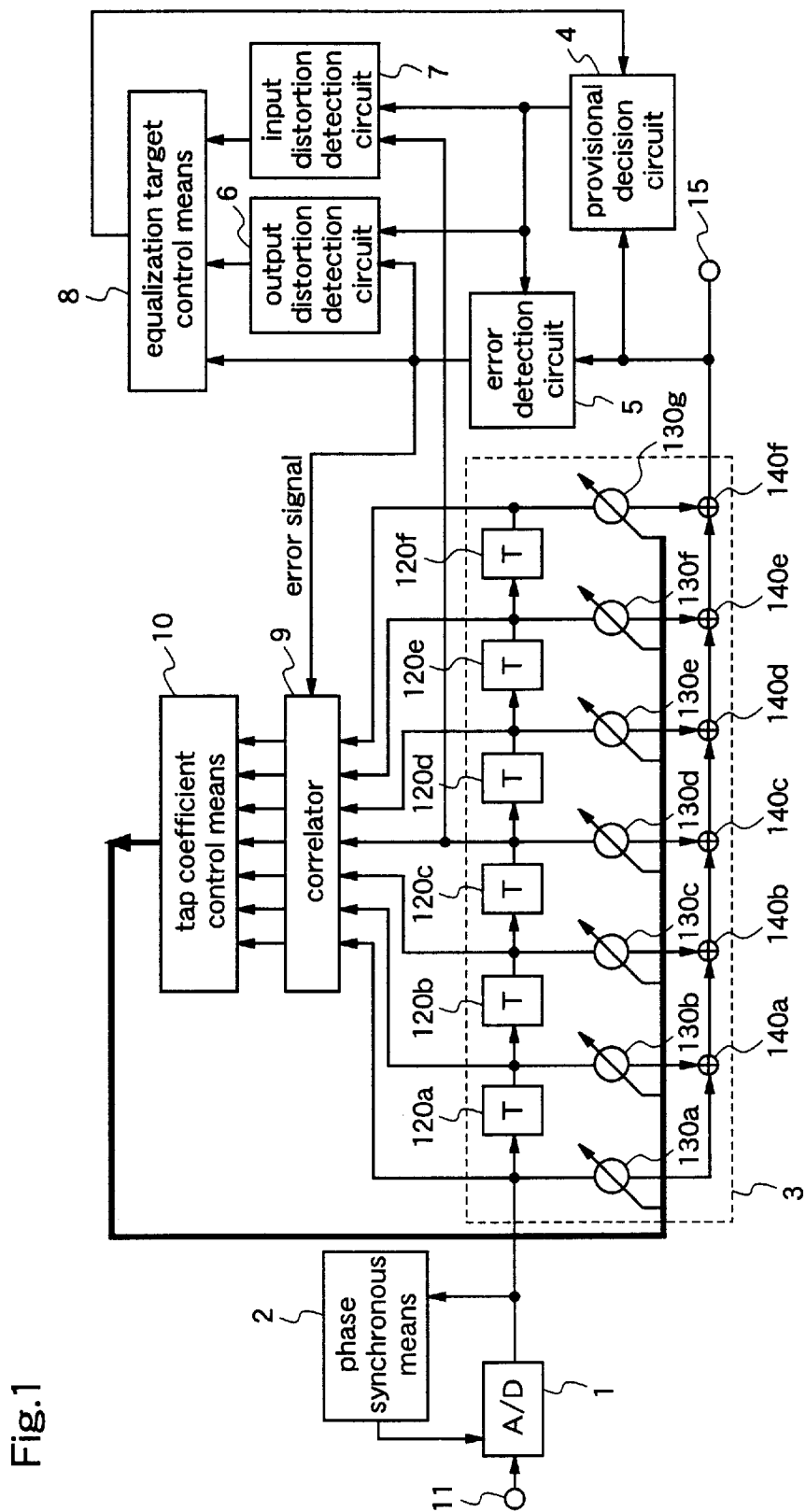
FIG. 1 is a block diagram for explaining the structure of an adaptive equalization circuit having non-linear distortions, according to a first embodiment of the present invention.
Figure 2:
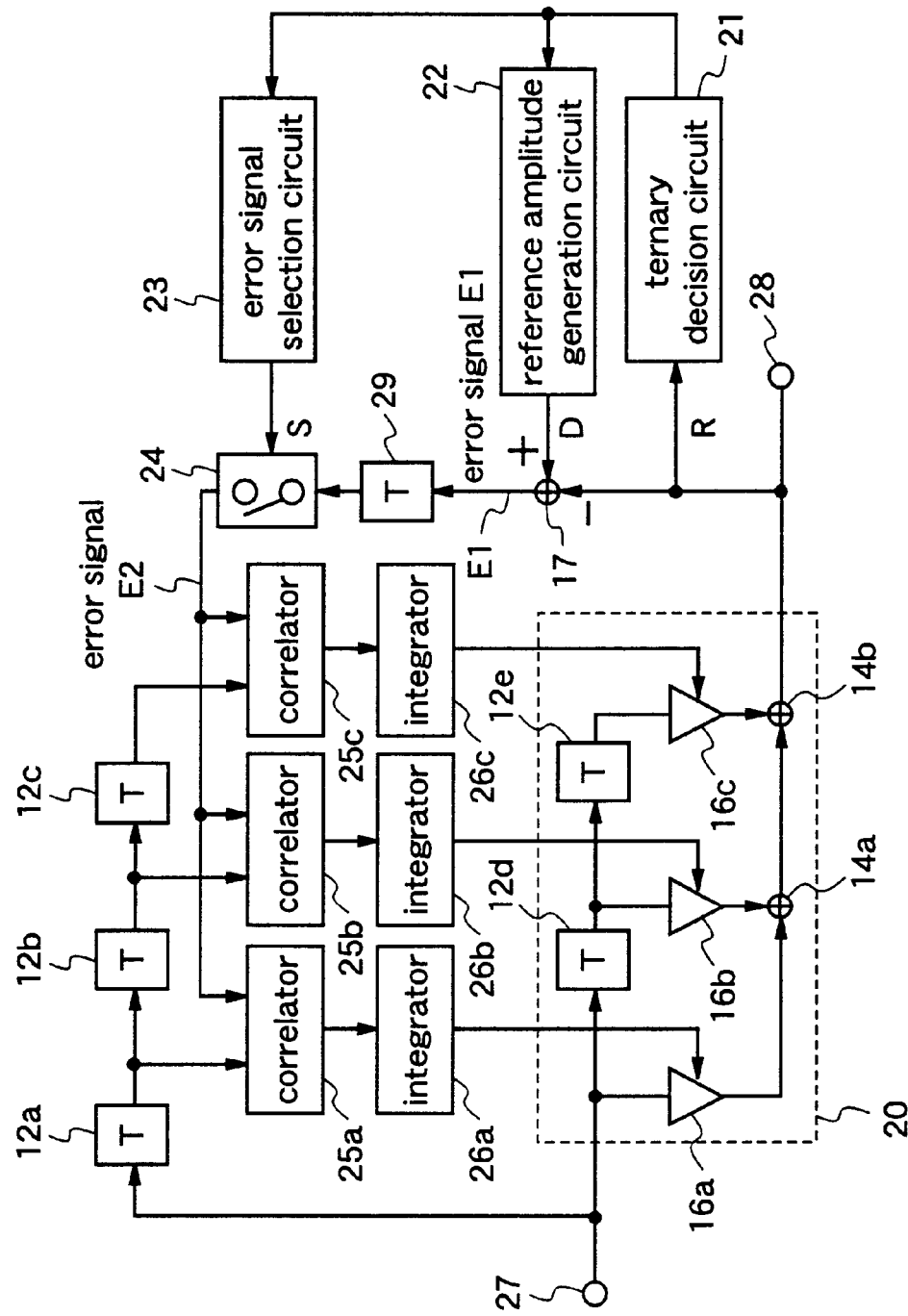
FIG. 2 is a block diagram for explaining the structure of the conventional adaptive equalization circuit.

FIG. 1 shows an adaptive equalization circuit suited to a non-linear signal, according to the first embodiment of the present invention. In FIG. 1, 11 denotes an input terminal for receiving an analog signal to be subjected to waveform equalization; 1 denotes an A/D converter for converting the analog signal from the input terminal 1 to a digital signal; 2 denotes a phase synchronization means for generating a reproduction clock according to the output signal from the A/D converter 1 and supplying it to the A/D converter 1; and 3 denotes a transversal filter as a linear equalization means which receives, as an input signal, the output signal from the A/D converter 1, and this transversal filter 3 has so-called FIR (Finite Impulse Response) type filter construction. In the transversal filter 3, 120a to 120f denote delay means which are connected in series in this order, and each delay means delays its input signal by one unit time T. The delay means 120a receives the input signal to the transversal filter 3. Further, 130a to 130f and 130g denote multipliers which receive, as one of two input signals, the input signals to the delay means 120a to 120f and the output signal from the delay means 120f, respectively; 140a denotes an adder for adding the output signals from the multipliers 130a and 130b; and 140b to 140f denote adders for adding the output signals from the adders 140a to 140e and the output signals from the multipliers 130c to 130g, respectively.

Further, 15 denotes an output terminal for outputting the output signal from the transversal filter 3 as an output signal of this adaptive equalization circuit; 4 denotes a provisional decision circuit which receives the output signal from the adaptive equalization circuit, and estimates an equalization target value for performing equalization without being affected by the input signal having non-linear distortions; 5 denotes an error detection circuit for detecting an error between the output signal from the provisional decision circuit 4 and the above-described input signal; 7 denotes an input distortion detection circuit for detecting an error between the provisionally decided value obtained from the provisional decision circuit 4 and the output signal from the A/D converter 1; 6 denotes an output distortion detection circuit for monitoring the error outputted from the error detection circuit 5; 8 denotes an equalization target control means for controlling the equalization target value so as to minimize the error (equalization error), on the basis of the signals detected by the error detection circuit 5, the input distortion detection circuit 7, and the output distortion detection circuit 6; 9 denotes a correlator for correlating the error signal from the error detection circuit and the input signal to each of the delay means 120a to 120f with the output signal from each delay means; and 10 denotes a tap coefficient control means for outputting tap coefficients to the other input terminals of the multipliers 120a to 120g so as to control the tap coefficients according to the output signal from the correlator 9.

Next, the operation will be described. In the adaptive equalization circuit according to the first embodiment, the input signal is converted into a digital signal by the A/D converter 1, and the digital signal is input to the transversal filter 3. Then, the signal is subjected to equalization based on a high-order partial response method called PR (3,4,4,3) by the transversal filter 3, and the equalized output is input to the provisional decision circuit 4. The decision circuit 4 detects a portion where points to be distinguished as five values exist, to cope with that the level of the input signal cannot be defined in advance. Then, the error detection circuit 5 detects an error between the output from the transversal filter 3 and a value to be possessed by the filter 3.

Thereafter, the input distortion detection circuit 7 receives the equalization target value outputted from the provisional decision circuit 4 and the input signal to the transversal filter 3, which is delayed by the delay means 120a to 120c, and detects input distortion by using the data before equalization. Further, the output distortion detection circuit 6 receives the equalization target value outputted from the provisional decision circuit 4 and the error outputted from the error detection circuit 5, and detects output distortion by using the data after equalization. The equalization target control means 8 receives the output from the error detection circuit 5, the output from the output distortion detection circuit 6, and the output from the input distortion detection circuit 7, and automatically controls the equalization target value of the provisional decision circuit 4 on the basis of the distortion data. On the other hand, the correlator multiplies the output from the error detection circuit 5 by the output of each tap of the transversal filter 3 (i.e., it multiplies the input signal to the transversal filter 3 by the output signal from each of the delay means 120a to 120f), and obtains a correlation between them. Then, the tap coefficient control means 10 outputs tap coefficients to the other input terminals of the multipliers 130a to 130g of the transversal filter 3, on the basis of the output signal from the correlator 9. Thereby, the control means 10 controls the tap coefficients so as to minimize the equalization error, on the basis of the algorithm of least square error.

In this way, the equalization error can be always minimized by performing adaptive equalization control on the basis of the asymmetry possessed by the input signal, which is detected when performing high-order partial response, whereby adaptive equalization of the reproduced waveform can be performed with higher precision.

Hereinafter, the operation of each constituent will be described.

Initially, a signal which has been recorded at high density and reproduced is input through the input terminal 11, and sampled by the A/D converter 1 which converts an analog signal to a digital signal, by using a reproduction clock generated by the phase synchronization means 2, and outputted to the transversal filter 3.

The transversal filter 3 executes equalization by setting seven pieces of filter coefficients as initial values of tap coefficients in the multipliers 130a to 130g.

Initially, equalization is carried out using, as tap coefficients of the transversal filter 3, the initial values of coefficients adapted to partial response equalization. However, when the equalization using the initial values has been performed on the entire adaptive circuit and there are no undefined values in the outputs from all the circuits, the tap coefficients, i.e., the initial values, are updated to perform adaptive equalization control.

The provisional decision circuit 4 for detecting an equalization target value from the output signal of the transversal filter 3, calculates a binary signal using the PR method to obtain a signal for selecting a fixed equalization target value, and selects an equalization target value to be updated by adaptive equalization control, from the five pieces of asymmetrical amplitude level values which are previously set as initial values, according to the signal obtained by the calculation.

Figure 3:
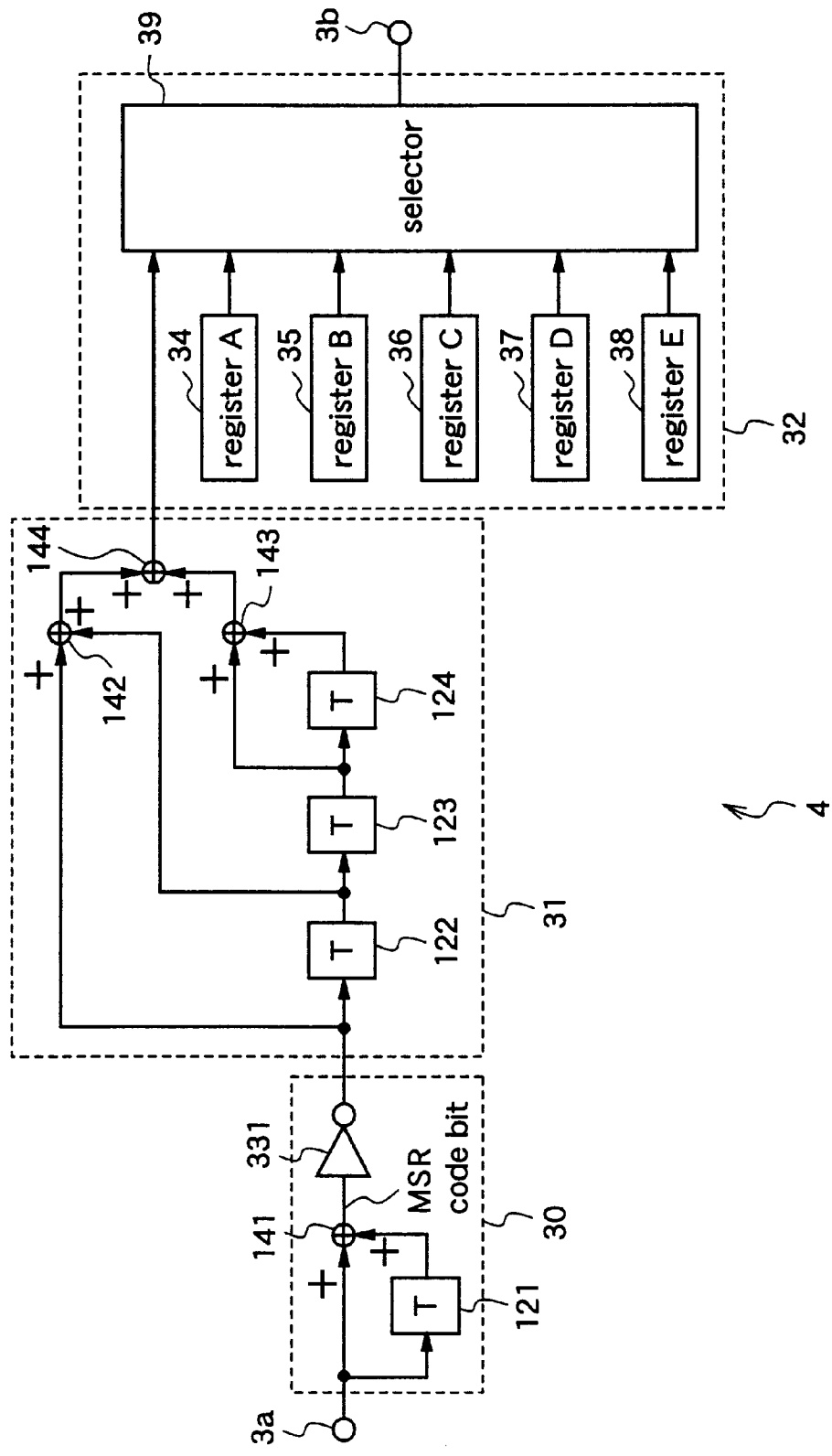
FIG. 3 is a block diagram for explaining the structure of a provisional decision circuit according to the first embodiment of the invention.

As shown in FIG. 3, the provisional decision circuit 4 is composed of a binary decision circuit 30, an addition circuit 31 depending on the type of the PR method, and an equalization target value selection circuit 32. The output signal from the traversal filter 3 is applied to an input terminal 3a of the provisional decision circuit 4, and the output from the equalization target control means 8 is stored in registers A (34) to E (38) of the equalization target value selection circuit 32. Further, an equalization target value decided by the provisional decision circuit 4 is output from an output terminal 3b.

In the binary decision circuit 30, 121 denotes a delay means for delaying the input signal from the input terminal 3a by one unit time; 141 denotes an adder for adding the output signal from the delay means 121 and the input signal supplied from the input terminal 3a; and 331 denotes an inverter for inverting only an MSB of the output signal from the adder 141, and outputting this to the addition circuit 31.

In the addition circuit 31, 122 to 124 denote delay means which are connected in series in this order, and each delay means delays its input signal by one unit time. The delay means 122 receives the output signal from the binary decision circuit 30. Further, 142 denotes an adder for adding the input signal to the delay means 122 and the output signal from the delay means 122; 143 denotes an adder for adding the input signal to the delay means 124 and the output signal from the delay means 124; and 144 denotes an adder for adding the output signal from the adder 142 and the output signal from the adder 143, and outputting the result to the equalization target value selection circuit 32.

In the equalization target value selection circuit 32, 34 to 38 denote registers A to E, respectively; and 39 denotes a selector for selecting one of the output signal from the addition circuit 31 and the output signals from the registers A (34) to E (38).

In the binary decision circuit 30, as shown in FIG. 3, the sum of the input signal supplied from the input terminal 3a and the output signal from the delay means (one delay operator) 121 is obtained by the adder 141 ((1+T) operation), and it is decided that the polarity of the MSB (Most Significant Bit) of the obtained signal is positive or negative. At this time, the polarity decision signal is inverted by the inverter 331 so that it becomes "1" when the polarity is positive and "0" when the polarity is negative, whereby the binary decision result of the input signal is obtained.

The binary decision signal so obtained is calculated using the high-order PR (3,4,4,3) method adapted to non-linear distortions, in the addition circuit 31 which depends on the type of the PR method. The PR (3,4,4,3) indicates that weights of "3", "4", "4", "3" are given to the original signal, and the signals obtained by delaying the original signal by one unit time, two unit time, and three unit time, respectively, when performing the partial response process.

In the conventional PR (1,1) equalizer, since the equalization target values are "−1.5", "−1", "0", "+1", "+1.5" in the opening of the eye pattern of the output signal, a difference in levels between the maximum amplitude of the eye pattern and an amplitude which is adjacent to the maximum amplitude with respect to the level is narrower than the differences in levels between other adjacent amplitudes. So, the levels of adjacent amplitudes are more uniform in the adaptive equalization circuit performing the high-order partial response equalization using the provisional decision circuit 4 according to the first embodiment than in the conventional equalizer and, therefore, the equalizer according to the first embodiment is more resistant to noise as compared with the conventional equalizer.

That is, the sum of the input signal to the addition circuit 31 and the output signal from the delay means (one delay operator) 122 is obtained by the adder 142 ((1+T) operation) and, further, the sum of the signal 2T which is obtained by delaying the output signal from the delay means (one delay operator) 122 by the delay means (one delay operator) 123, and the signal 3T which is obtained by further delaying the signal 2T by the delay means (one delay operator) 124 is obtained by the adder 143 ((2T+3T) operation), and then the sum of the output signals from the adders 142 and 143 is obtained by the adder 144 ((1+T)+(2T+3T) operation).

The signal so obtained is subjected to addition depending on the type of the ternary partial response method in the equalization target value selection circuit 32, whereby it becomes clear in advance that the equalization target values are five values. Then, according to the signal so obtained, the selector 39 selects an equalization target value from the five equalization target values stored as initial values in the registers A (34) to E (38), thereby performing adaptive equalization control. Likewise, an equalization target value is selected in similar manner from the values obtained by updating the equalization target values.

Figure 4:
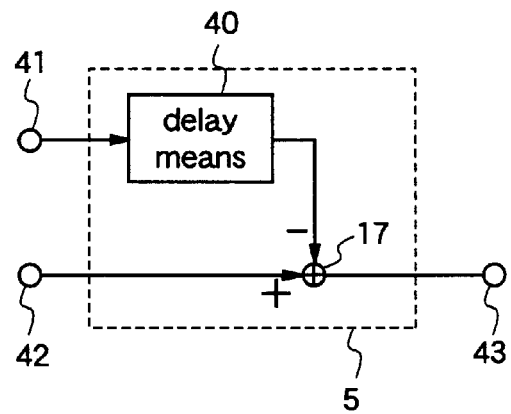
FIG. 4 is a diagram for explaining the structure of an error detection circuit according to the first embodiment of the invention.

As shown in FIG. 4, the error detection circuit 5 shown in FIG. 1 comprises a delay means 40 for delaying the output signal from the transversal filter 3 which is input through an input terminal 41, and a subtracter 17 for subtracting the output signal of the delay means 40 from the output signal of the provisional decision circuit 4 which is input through an input terminal 42.

In the error detection circuit 5, the subtracter 17 performs subtraction to detect an error between the output signal from the provisional decision circuit 4 and the output signal from the transversal filter 3, thereby obtaining an error (equalization error) from the equalization target value. At this time, since a timing lag occurs between the output signal from the transversal filter 3 and the output signal from the provisional decision circuit 4, the output signal from the transversal filter 3 is delayed by a time equivalent to this lag.

The input distortion detection circuit 7 has the same structure as that of the error detection circuit 5 shown in FIG. 4. In the circuit 7, the subtracter 17 performs subtraction to detect an error between the output signal from the provisional decision circuit 4 and the output signal from the A/D converter 1. That is, the output signal from the A/D converter is supplied to an input terminal corresponding to the input terminal 41 through the delay means 120a to 120c, and the output signal from the provisional decision circuit 4 is supplied to an input terminal corresponding to the input terminal 42.

Figure 5:
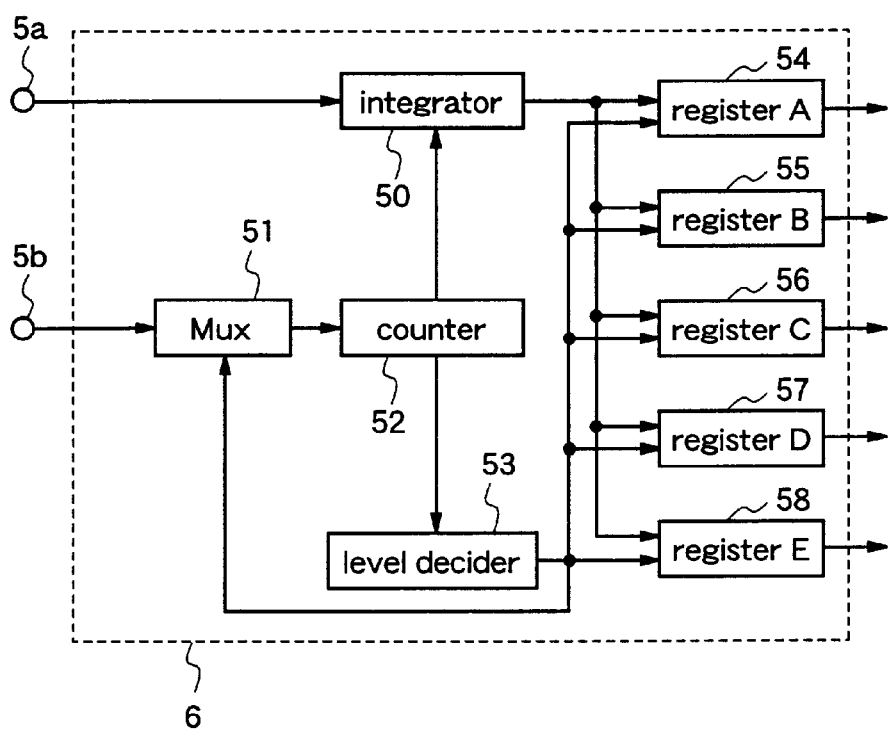
FIG. 5 is a diagram for explaining the structure of an output distortion detection circuit according to the first embodiment of the invention.
Figure 6:
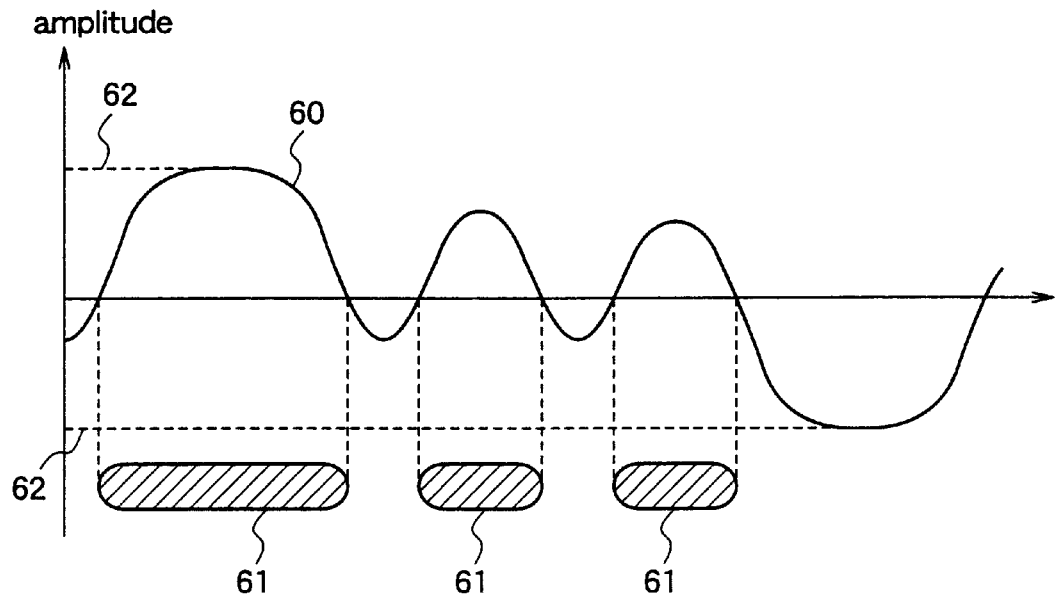
FIG. 6 is a diagram for explaining the cause of non-linear distortions which occur during magnetic recording and playback.
Figure 7:
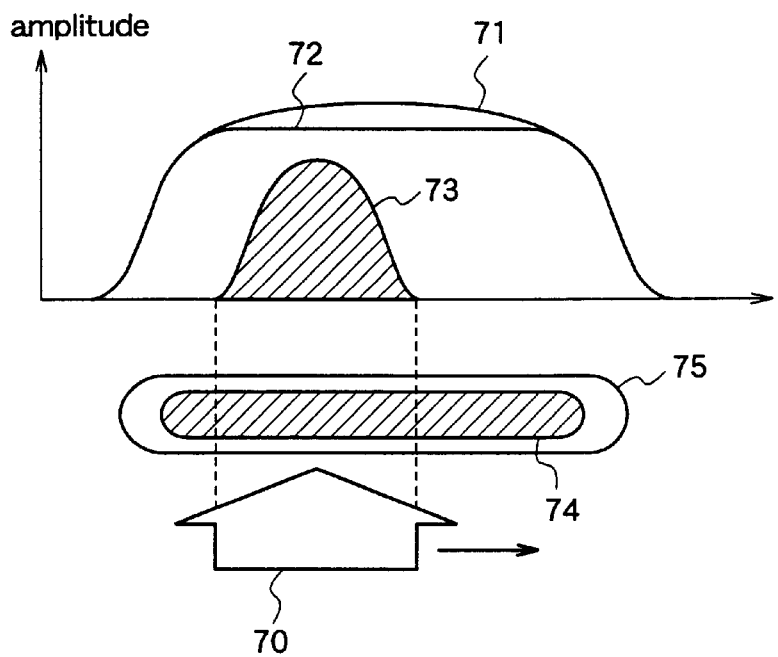
FIG. 7 is a diagram for explaining the cause of non-linear distortions which occur during optical recording and playback.

As shown in FIG. 5, the output distortion detection circuit 6 comprises an integrator 50 for integrating the equalization error signal inputted through an input terminal 5a; a multiplexer 51 to which a signal for selecting a target value for each level from the five equalization target values is input through an input terminal 5b; a counter 52 for counting the output from the multiplexer 51; a level decider 53 for deciding the level of the output from the counter 52; and registers A (54) to E (58) to which the output from the integrator 50 is input.

In the equalization target value selection circuit 32, a signal for selecting a target value for each level from the five equalization target values, is supplied to the multiplexer 51 through the input terminal 5b of the output distortion detection circuit 6.

According to this signal, it is decided which level amongst the five values is to be integrated, and the sum of the errors in the decided level is obtained until the counter 52 reaches a count which is previously given to the counter 52. At the same time, the integrator 50 is reset to "0", and the equalization errors outputted from the error detection circuit 5 are supplied through the input terminal 5a to the integrator 50, and the equalization errors are summed up within the time set in the counter 52. When the counter 52 reaches the set count, the level decider 53 selects the next level from the five levels, and the total error is stored in any of the register A (54) to E (58), followed by repetition of the same operation as mentioned above.

The counter 52 counts the frequency of the level to be summed among the five levels, and the level decider 53 has the function of controlling which level is to be counted during counting.

The above-described operation will be explained taking an example. When level A is selected according to the signal for selecting an equalization target value of the equalization target value selection circuit 32, the equalization errors in the level A are integrated, and when the counter 52 reaches the set count, the addition is ended and the integrator 50 is reset, and then the total amount of errors is stored in the register 54. When level B is selected next, the counter 52 starts count from 0, and the amount of errors in the level B is integrated. In this way, the total amount of errors is successively integrated from level to level, and when addition of quantization errors is completed with respect to the level A to the level E, the same process is performed from the level A to the level E and the result is stored in the corresponding register. Thus, with respect to the level of each of the registers A (54) to E (58), the value stored in each register is replaced with the latest total amount of errors obtained in the integrator 50.

As described above, in the output distortion detection circuit 6, since the counter controls integration, the number of times of integration is uniform. So, when the total amount of equalization errors is checked, it is precisely detected which level has the largest amount of errors among the five levels. Further, since the number of the levels inputted is larger than the number of the level selected, the count increments rapidly, and thereby the calculation is completed rapidly, resulting in high efficiency. In the equalization target control means 8 which receives the output signal from the input distortion detection circuit 7, the output signal from the output distortion detection circuit 6, and the signals stored in the registers A (54) to E (58) of the output distortion detection circuit 6 shown in FIG. 5, correction is performed on the basis of the signals stored in the registers A (54) to E (58) of the output distortion detection circuit 6.

At this time, the output signal from the input distortion detection circuit 7 and the output signal from the output distortion detection circuit 6 are referred to, and the equalization target value is controlled so as to correct it by comparing it with these two output signals, whereby the latest equalization target value which provides a minimum error is given to each of the register A (34) to register E (38) of the provisional decision circuit 4 shown in FIG. 3.

Figure 8:
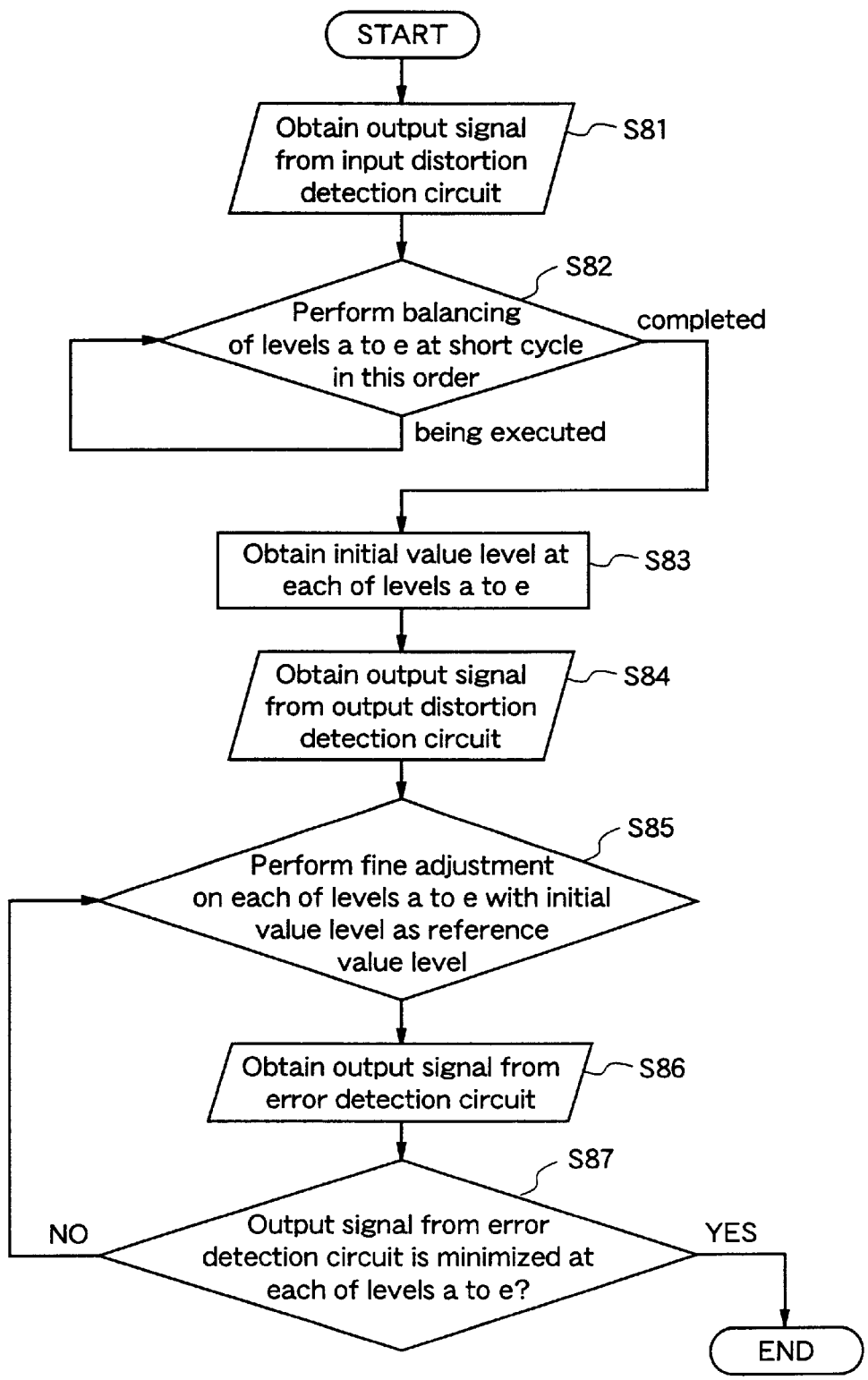
FIG. 8 is a flow chart for explaining the operation of an equalization target control means according to the first embodiment of the present invention.

FIG. 8 is a flowchart showing the operation of the equalization target control means which corrects the equalization target value. In step S81, the value of the input distortion detected by the input distortion detection circuit 7 is read. Next, in step S82, this input distortion is balanced at a short cycle from level a to level e to estimate the level of the equalization target value. The levels a to e are five values to be the equalization target values which are set at intervals of "3", "4", "4", "3", and level a to level e are assigned to these target values in the descending order. Then, in step S83, the initial levels of the level a to level e are obtained, and these levels are stored as initial values in the registers A to E of the equalization target value selection circuit 32 shown in FIG. 3. Next, in step S84, the output signal from the output distortion detection circuit is read. Then, in step S85, each of the level a to level e is fine-adjusted with the initial value level as a reference value level. In step S86, the output signal from the error difference detection circuit is read and, thereafter, steps S85 to S87 are repeated until a level, at which the output signal from the error detection circuit is minimized with respect to each of the levels a to e, is obtained in step S87. Through these steps, an equalization target value for correcting the provisionally decided value obtained by the provisional decision circuit is obtained.

Updation of the tap coefficients is carried by the tap coefficient control means 10 having seven tap coefficients, which is composed of correlators, integrators, and delay means as in the conventional one. To be specific, the tap coefficients are calculated by using the correlation between the error from the equalization target value and the reference output signal from the transversal filter 3, which correlation is obtained by the correlator 9, and then the tap coefficients are updated.

Figure 9:
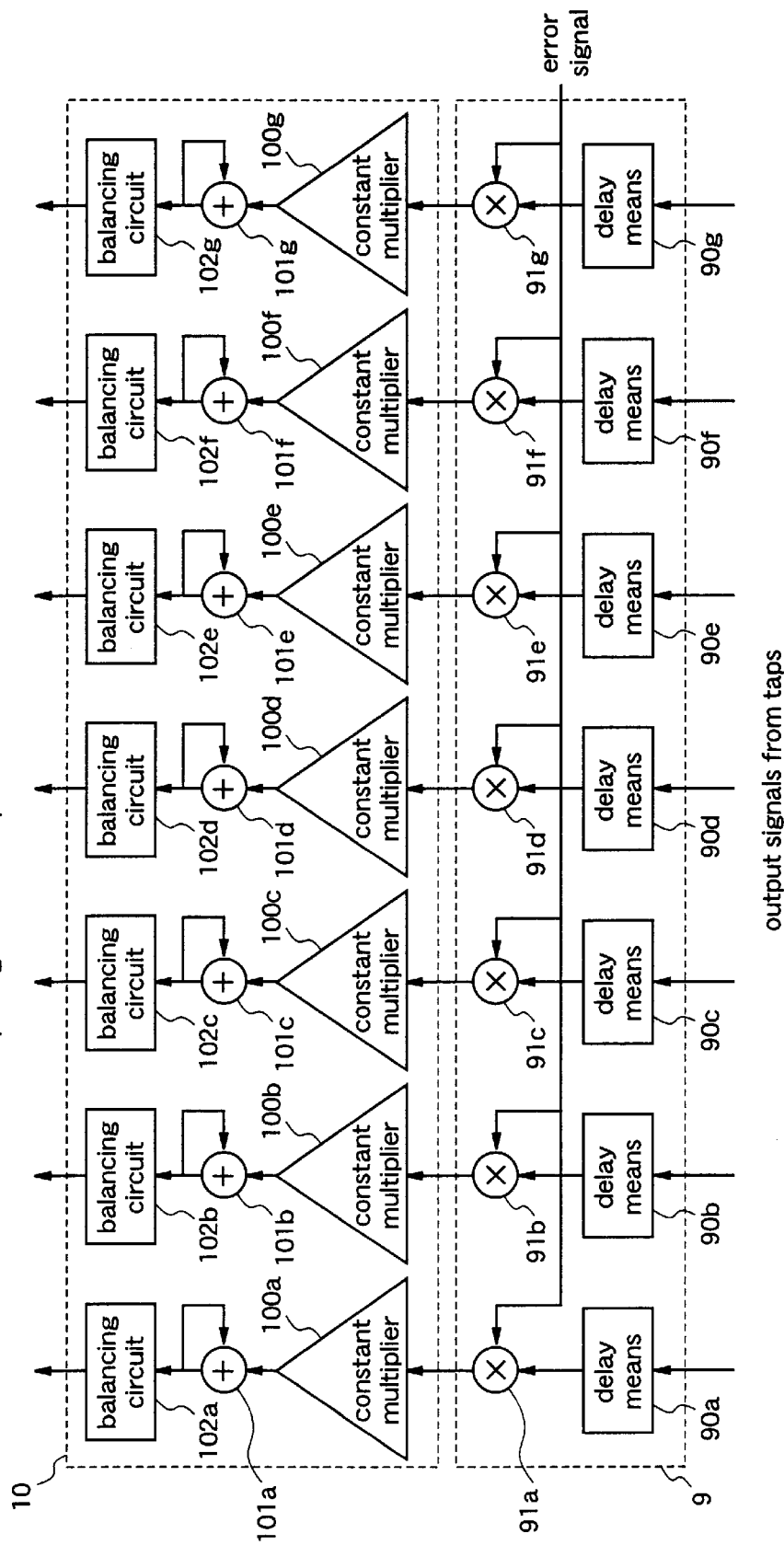
FIG. 9 is a diagram for explaining a correlator and a tap coefficient control means according to the first embodiment of the invention.

That is, as shown in FIG. 9, in the correlator 9, multipliers 91a to 91g receive the error signal and the input signals from the taps that are successively delayed by delay means 90a to 90g, and multiply these signals to obtain the correlation values. In the tap coefficient control means 10, buffers 100a to 100g constant-multiply the correlation values according to the gains, and adders 101a to 101g integrate its input by feeding its output back to the input, and balancing circuits 102a to 102g balance the outputs from the adders 101a to 101g by dividing them with the number of samples.

This balancing is performed roughly by increasing the gains of the buffers 100a to 100g while it is performed smoothly by decreasing the gains, and the balanced values are input to the respective multipliers of the transversal filter.

Then, each of the multipliers 130 in the transversal filter 3 multiplies the tap coefficient and the output signal from the A/D converter 1, thereby performing adaptive equalization to minimize the equalization error. Under the feedback control in the adaptive equalization circuit as a whole, the coefficient control means 10 for controlling the tap coefficients updates the tap coefficients at any time, and when the equalization error is minimized, each tap coefficient becomes to have a constant value, whereby the equalized output signal from the transversal filter 3 is finally divided into five amplitude levels.

That is, the adaptive equalization circuit according to the first embodiment is characterized by that it performs high-order partial response equalization on the positive or negative asymmetric amplitude level values having five equalization target values for equalizing a reproduced signal having non-linear distortions, and the recorded data can be reproduced with improved error rate by connecting the maximum likelihood decoder to the rear of the adaptive equalization circuit. Further, this adaptive equalization circuit employs seven tap coefficients, and the tap coefficients are adaptively controlled so that high-order partial response equalization is achieved for the equalized output.

While in the above description those various means are restrictively described, various modifications may be adaptively given to them as long as men of skill in the art can design them.

As described above, according to the adaptive equalization circuit of the first embodiment, the transversal filter subjects an input signal having non-linear distortions to high-order partial response equalization; the provisional decision circuit estimates an equalization target value; the error detection circuit detects an error between the target value decided by the provisional decision circuit and the output signal from the transversal filter; the input distortion detection circuit detects the input distortion by detecting an error between the signal obtained by delaying the input signal in the transversal filter and the provisionally decided value; the output distortion detection circuit detects the output distortion by monitoring an error between the error detected by the error detection circuit and the provisionally decided value;, the equalization target detection means controls the equalization target value so that the equalization error is minimized, on the basis of the outputs from the error detection circuit, the output distortion detection circuit, and the input distortion detection circuit; the correlator multiplies the tap output of the transversal filter and the error detected by the error detection circuit to obtain the correlation between them; and the tap coefficient control circuit controls the tap coefficients of the transversal filter on the basis of the correlation detected by the correlator. Therefore, an input signal having non-linear distortions, which is reproduced from a high-density recording medium such as a DVD, is subjected to high-order partial response equalization so as to minimize the equalization error. As the result, equalization can be performed so as to minimize the equalization error even when the input signal is asymmetric.

APPLICABILITY IN INDUSTORY

As described above, an adaptive equalization circuit according to the invention of claim 1 is suitable for equalizing a reproduced signal with high precision when reproducing a signal having non-linear distortions from a recording medium on which data is recorded at a high density, such as an optical disk, especially a DVD.

Further, an adaptive equalization circuit according to the invention of claim 2 is suitable for estimating an equalization target value for performing equalization, without being affected by a signal having non-linear distortions.

Moreover, an adaptive equalization circuit according to the invention of claim 3 is suitable for estimating an equalization target value for performing equalization, without being affected by a signal having non-linear distortions.

What is claimed is:

1. An adaptive equalization circuit for equalizing an input signal having non-linear distortions, comprising:

a linear equalization means for subjecting the input signal having non-linear distortions to high-order partial response equalization adapted to the input signal;

a provisional decision circuit for receiving, as an input signal, the output signal from the linear equalization means, and estimating an equalization target value for performing equalization without being affected by the non-linear distortions of the input signal;

an error detection circuit for detecting an error between the provisionally decided equalization target value obtained from the provisional decision circuit and the output signal from the linear equalization means;

an input distortion detection circuit for detecting an error between the provisionally decided value obtained from the provisional decision circuit and the input signal;

an output distortion detection circuit for monitoring the error outputted from the error detection circuit;

an equalization target control means for controlling the equalization target value from the provisional decision circuit so that the equalization error is minimized, on the basis of the signals detected by the error detection circuit, the input distortion detection circuit, and the output distortion detection circuit; and a tap coefficient control circuit for controlling tap coefficients of the linear equalization means on the basis of the error detected by the error detection circuit.

2. An adaptive equalization circuit as described in claim 1 wherein said provisional decision circuit comprises:

a binary decision circuit for deciding that the output signal from the linear equalization means is either "0" or "1";

an addition circuit for subjecting the signal obtained by the binary decision circuit to calculation based on high-order partial response type addition, to obtain how many equalization target values exist; and an equalization target value selection circuit for selecting an appropriate equalization target value from the prepared equalization target values, on the basis of the signal obtained by the addition circuit.

3. An adaptive equalization circuit as described in claim 1 wherein said equalization target control means updates a plural equalization target values at the same time or updates every other equalization target values when controlling the equalization target value so as to minimize the equalization error.

* * * * *